United States Patent [19]

Bielfeldt

[11] Patent Number: 4,909,719

[45] Date of Patent: Mar. 20, 1990

[54] HEATED PLATEN PRESS OF WINDOW FRAME-LIKE CONSTRUCTION

[75] Inventor: Friedrich B. Bielfeldt, Eppingen, Fed. Rep. of Germany

[73] Assignee: Maschinenfabrik J. Dieffenbacher GmbH & Co., Eppingen, Fed. Rep. of Germany

[21] Appl. No.: 147,489

[22] Filed: Jan. 25, 1988

[30] Foreign Application Priority Data

Feb. 2, 1987 [DE] Fed. Rep. of Germany ....... 3702995

[51] Int. Cl.$^4$ ............................................. B29C 43/32

[52] U.S. Cl. .................................. 425/186; 100/93 P; 100/93 RP; 156/583.1; 156/583.5; 425/193; 425/371; 425/406

[58] Field of Search ................. 100/93 P, 93 RP, 151; 156/555, 582, 583.1, 583.5; 425/371, 406, 407, 186, 188, 193

[56] References Cited

U.S. PATENT DOCUMENTS 3,956,058 5/1976 Wemhoener ..................... 156/583.1
4,053,276 10/1977 Ahrweiler et al. ................. 425/371
4,130,384 12/1978 MacMillan ............................ 425/25
4,164,387 8/1979 Schermutzki et al. .............. 425/371
4,365,548 12/1982 Pankoke ............................. 425/371
4,375,350 3/1983 Sato .................................... 425/371
4,448,575 5/1984 Hanyu et al. ...................... 425/451.2
4,557,792 12/1985 Yamada et al. .................. 156/583.1
4,589,948 5/1986 Held .................................... 425/371
4,759,280 7/1988 Malashenko ........................ 425/193

*Primary Examiner*—Jay H. Woo
*Assistant Examiner*—C. Scott Bushey
*Attorney, Agent, or Firm*—Foley & Lardner, Schwartz, Jeffery, Schwaab, Mack, Blumenthal & Evans

[57] ABSTRACT

A heated platen press of window frame-like construction is disclosed for producing particle boards, fiber boards or the like. The press comprises, a fixed press table in a press frame and a press ram which may be raised and lowered. Heatable platens are attached to the press table and to the press ram. Spacers which may be inserted or removed within the frame are provided for shortening the effective pressing stroke of short-stroke cylinders.

5 Claims, 2 Drawing Sheets

HEATED PLATEN PRESS OF WINDOW FRAME-LIKE CONSTRUCTION

The invention relates to a heated platen press of window frame-like construction.

BACKGROUND OF THE INVENTION

In a heated platen press of this kind, the press ram and the press table are composed solely of web plates and transverse ribs connecting the latter (German Laid-Open Application DE-OS No. 3,149,243). A plurality of web plates having transverse ribs are welded together to form a box beam and by juxtaposing and attaching heating plates in turn represent the length of the press ram and the press table and thus of the heated platen press. The extensions or projections protruding from the web plates on the left and on the right act as abutments for the drawing frame press supports for raising and lowering the press ram, the pressing cylinder piston arrangements being arranged between the upper stationary crossheads and the extensions of the press ram. A heated platen press designed in this way guarantees perfect plane-parallel platen force transmission over the breadth of the pressing material to be pressed.

At the same time, however, the pressing cylinders must be of long-stroke construction in order to be able in addition to raise the press ram beyond the pressing stroke required, since the press platen region too must also be accessible for maintenance and repair. This entails a high and expensive input of materials for the pressing cylinder piston arrangements and high energy consumption on account of the large quantity of oil required.

SUMMARY OF THE INVENTION

It is the object of the present invention to design a heated platen press of the type specified, in a manner such that short-stroke pressing cylinder piston arrangements can be employed for the actual pressing stroke and pressing force.

This object is achieved according to the invention by the features and measures described and claimed herein.

Evident advantages of the invention are low energy consumption and the reduction in the cost of the heated platen press by the use of the short-stroke cylinder piston arrangements.

A further advantage is that the quantities of oil to be controlled and regulated are very small and the pressure build-up times, because of the low compression volume of the oil column, are also very short during normal operation on account of the low volume of oil in the cylinders. Another important factor here is that the quantity of oil to be compressed is about 20 times less than in a fully hydraulic system of the conventional type. Smaller moving quantities of oil assist rapid and exact regulation of the plane parallelism of the press platens with respect to one another via the short-stroke cylinders during pressing in the absence of spacer strips.

DESCRIPTION OF PREFERRED EMBODIMENTS

Figure 1:
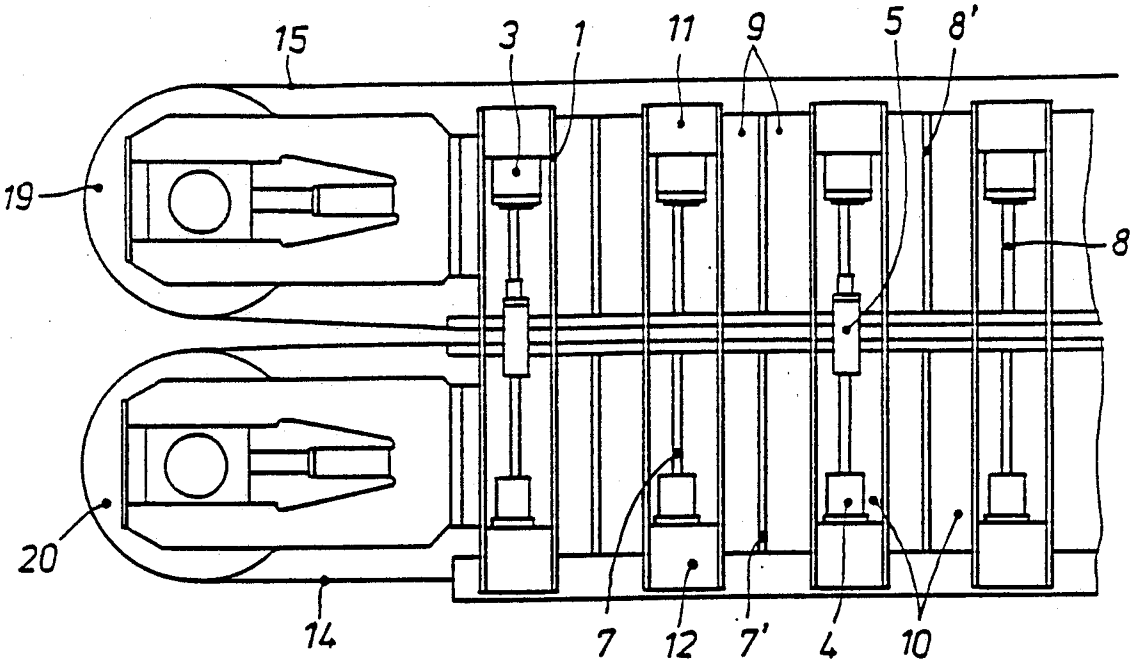
FIG. 1 shows the heated platen press according to the invention, in side elevation.

The main parts of the heated platen press are the fixed press table 3, the movable press ram 2 and the drawing frame press supports 1, which are guided at the two longitudinal sides of the press table 3 and anchored at the press ram 2. The press ram 2 and the press table 3 are composed solely of the web plates 7 and 8 and the transverse ribs 9 and 10 connecting the latter. A plurality of web plates 7 and 8 having transverse ribs 9 and 10 are welded together to form a box beam and by juxtaposing and attaching the heating plates 16 and 17 form the length of the press ram 2 and the press table 3 and thus the heated platen press. The extensions 21 and 22 or projections protruding from the web plates 7 and 8 on the left and right act as abutments for the drawing frame press supports 1 for raising and lowering the press ram 2, the short-stroke pressing cylinder piston arrangements 6 being arranged between the upper stationary crossheads 11 and the extensions 21 of the press ram 2. A drawing frame press support 1 comprises the tie-bars 13, the upper stationary crosshead 11 and the lower stationary crosshead 12. It is the finding of the invention that short-stroke pressing cylinder arrangements 6 are sufficient for the effective pressing stroke of a one-daylight press (German Patent DE-PS No. 1,943,525) but in particular for continuously operating double-belt continuous presses (c.f. German Patent DE-PS No. 1,939,784).

Figure 2:
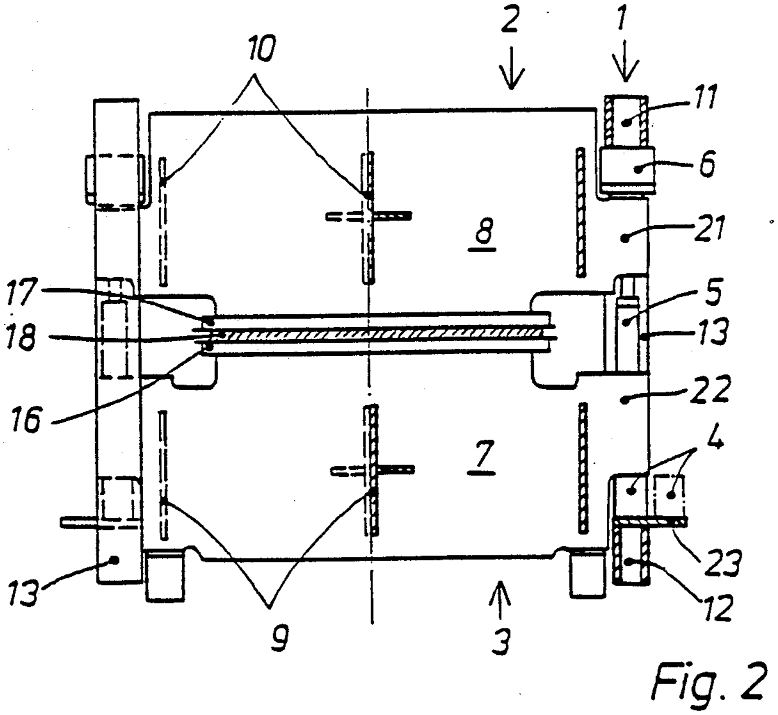
FIG. 2 shows the heated platen press according to FIG. 1 in front elevation and in section.
Figure 3:
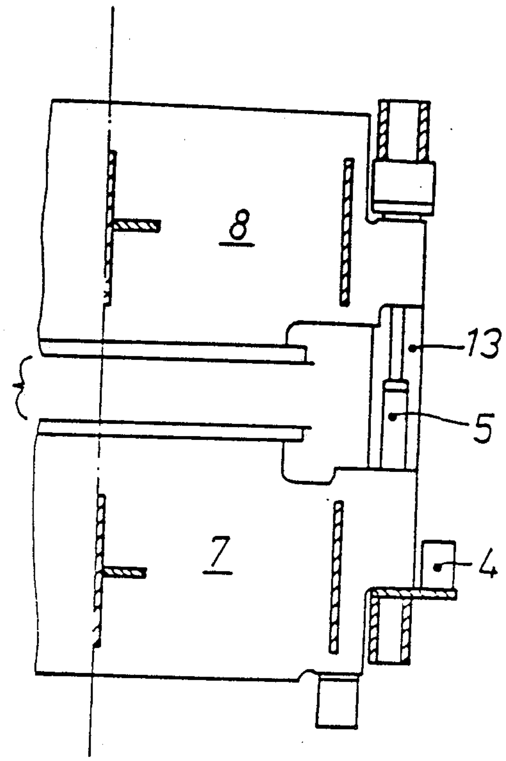
FIG. 3 shows the heated platen press as shown in FIG. 2 but with the spacer withdrawn and the press ram raised.

FIG. 1 shows a double-belt continuous press. The otherwise conventional one-daylight press construction also includes the drive drums 19 and 20 and the steel belts 14 and 15 pulling the material 18 to be pressed through the pressing gap. Since, however, the press platen region must be freely accessible for maintenance and repair, the arrangement of spacers 4 which can be inserted into or withdrawn from the drawing frame press supports 1 and shorten the effective pressing stroke is envisaged. These spacers 4 are installed in a manner such that they can be withdrawn onto the platforms 23 either manually or by means of a drive arrangement (not shown) which can be switched in. To withdraw the spacers 4 and additionally raise the press ram 2, the press ram 2 must admittedly first of all be placed on the lower heating plate 16 in the absence of a compact 18. If, as shown in FIG. 2, the spacers 4 have been withdrawn to the outer edge of the platform 23, the long-stroke cylinders 5 arranged between the extensions 21 and 22 and having pistons (not shown) can raise the press ram 2 above the effective processing force position until the platforms 23 bear against the lower sides of the extensions 22 of the press table 3. With the press ram 2 in this position, the press platen region is freely accessible for repair and maintenance. Since the longstroke cylinders 5 are required solely for raising the press ram 2, their number and quality can be kept to the absolute minimum requirements. Thus it is understandable that the long-stroke cylinder piston arrangements 5 and should be arranged out in every second or third drawing frame press support 1.

I claim:

1. A pressing assembly for a heated platen press of window frame like construction having a press ram, press table and drawing frame press support means, said assembly comprising:

short-stroke cylinder means for moving the press ram from a first operation position to effect a pressing stroke;

long-stroke cylinder means for controllably moving the press ram from the first operation position to a second repairing position;

spacer means, on said drawing frame support means, for shortening the effective pressing stroke in a first spacer position;

said spacer means being movable to a second spacer position so that the long-stroke cylinder means move the press ram to the second repairing position.

2. A treated platen press of window frame like construction, comprising:

a fixed press table;

a movable press ram for providing a pressing force;

drawing frame support means for guiding the movement of said press ram;

short-stroke cylinder piston means for moving the press ram in the drawing frame support means within a pressing force region;

heatable press platens attached to the press table and press ram;

spacer means, on said drawing frame support means, for shortening the effective pressing force stroke;

long-stroke cylinder piston means for raising and lowering the press ram from the pressing force region;

said spacer means being movable from a first stroke shortening position to a second spacer position so that the long-stroke cylinder piston means raises the press ram from the pressing force region.

3. The heated platen press according to claim 2, wherein said movable press ram is disposed over and substantially parallel to said fixed press table;

said fixed press table and movable press ram each having two longitudinal sides; and said drawing frame support means being arranged along each longitudinal side.

4. The heated platen press according to claim 3, wherein said drawing frame support means further comprises a plurality of tie bars arranged perpendicularly to said press table and press ram;

at least one upper stationary cross head and lower stationary cross head connected by a pair of said tie bars; and a plurality of protruding platforms which support said spacer means in said second position.

5. The heated platen press according to claim 2, wherein the fixed press table includes a plurality of projection portions;

said drawing frame support means includes a plurality of platform members which support said spacer means in said second spacer position; and said platform members abut said projection portions when the press ram is raised from the pressing force region.

* * * * *